US007594855B2

(12) United States Patent
Meyerhofer

(10) Patent No.: US 7,594,855 B2
(45) Date of Patent: Sep. 29, 2009

(54) METHOD AND APPARATUS FOR GAMING PROMOTIONAL PRINTER

(75) Inventor: Mark Meyerhofer, La Canada, CA (US)

(73) Assignee: FutureLogic, Inc., Glendale, CA (US)

( * ) Notice: Subject to any disclaimer, the term of this patent is extended or adjusted under 35 U.S.C. 154(b) by 765 days.

(21) Appl. No.: 10/405,112

(22) Filed: Mar. 31, 2003

(65) Prior Publication Data

US 2004/0095604 A1    May 20, 2004

Related U.S. Application Data

(60) Provisional application No. 60/369,097, filed on Mar. 29, 2002.

(51) Int. Cl.
*A63F 13/00* (2006.01)
*A63F 13/08* (2006.01)
*G06F 9/00* (2006.01)
*G06F 9/02* (2006.01)
*A63F 9/24* (2006.01)

(52) U.S. Cl. ............... 463/42; 358/1.15; 463/16; 463/40; 463/1; 463/25; 705/14; 705/1; 700/91

(58) Field of Classification Search ....... 358/1.15–1.18, 358/1.1; 463/25, 16, 1, 29, 36, 39–43; 705/14; 710/11, 17; 235/375, 381; 700/231, 232; 221/1, 2, 7–10

See application file for complete search history.

(56) References Cited

U.S. PATENT DOCUMENTS 4,723,212 A    2/1988    Off et al.

(Continued)

FOREIGN PATENT DOCUMENTS

EP    0173835 A2    3/1986

(Continued)

OTHER PUBLICATIONS

Futurelogic, Inc., "Heavy Duty Dollar Bill Size Direct Thermal Kiosk Printer User's Manual", Copyright 2000.

(Continued)

*Primary Examiner*—Twyler L Haskins
*Assistant Examiner*—Chad Dickerson
(74) *Attorney, Agent, or Firm*—Fitzpatrick, Cella, Harper & Scinto

(57) ABSTRACT

A method and apparatus for a gaming promotional printer for use within a cashless enabled gaming machine are disclosed. A gaming promotional printer includes a coupon database describing a stack of coupons that are specified using a template based couponing printer language. A coupon is selected for creation and issued to the player based on a matrix of event-based triggers involving factors or parameters known to the gaming promotional printer directly or supplied by master promotional controller. Triggers may include the time of day, the date or amount of a cash-out voucher to be issued to a player, the duration of play on a gaming machine, a player classification, the amount of money or credits added to a game, or a random frequency of coupon issuance having satisfied any or all of the aforementioned factors. The gaming promotional printer may further include the ability to store all of the coupons, trigger conditions, and related information resident in the gaming promotional printer in a non-volatile fashion thus enabling a host system to download a promotional environment into the gaming promotional printer which will run promotional campaigns on behalf of the hosting system.

84 Claims, 9 Drawing Sheets

U.S. PATENT DOCUMENTS

| | | |
|---|---|---|
| 4,910,672 A | 3/1990 | Off et al. |
| 5,075,874 A | 12/1991 | Steeves et al. |
| 5,256,863 A | 10/1993 | Ferguson et al. |
| 5,612,868 A | 3/1997 | Off et al. |
| 5,816,918 A | 10/1998 | Kelly et al. |
| 5,909,673 A | 6/1999 | Gregory |
| 5,943,241 A * | 8/1999 | Nichols et al. ............... 700/232 |
| 5,982,997 A | 11/1999 | Stone et al. |
| 6,015,344 A * | 1/2000 | Kelly et al. .................... 463/16 |
| 6,048,269 A | 4/2000 | Burns et al. .................... 463/25 |
| 6,327,044 B1 | 12/2001 | Shima |
| 6,394,907 B1 | 5/2002 | Rowe |
| 6,415,341 B1 | 7/2002 | Fry, Sr. et al. |
| 6,493,104 B1 | 12/2002 | Cromer et al. ............. 358/1.15 |
| 6,511,377 B1 * | 1/2003 | Weiss .......................... 463/25 |
| 6,575,090 B1 | 6/2003 | Vienneau et al. |
| 6,612,984 B1 | 9/2003 | Kerr, II ....................... 600/300 |
| 6,620,046 B2 | 9/2003 | Rowe |
| 6,647,437 B2 | 11/2003 | Ackerman et al. |
| 6,862,575 B1 * | 3/2005 | Anttila et al. ................. 705/14 |
| 6,892,182 B1 * | 5/2005 | Rowe et al. ................... 705/14 |
| 6,896,618 B2 * | 5/2005 | Benoy et al. .................. 463/25 |
| 6,923,721 B2 * | 8/2005 | Luciano et al. ............... 463/24 |
| 6,924,903 B2 * | 8/2005 | Brooks et al. .............. 358/1.15 |
| 6,990,392 B1 * | 1/2006 | Meister et al. .............. 700/242 |
| 7,008,320 B2 * | 3/2006 | Rowe et al. .................... 463/25 |
| 2002/0034977 A1 * | 3/2002 | Burns et al. .................... 463/25 |
| 2002/0077901 A1 * | 6/2002 | Katz ............................ 705/14 |
| 2002/0107065 A1 * | 8/2002 | Rowe .......................... 463/20 |
| 2002/0111210 A1 * | 8/2002 | Luciano et al. ............... 463/29 |
| 2002/0113124 A1 * | 8/2002 | Meyerhofer et al. ......... 235/454 |
| 2003/0013513 A1 * | 1/2003 | Rowe .......................... 463/20 |
| 2003/0013527 A1 * | 1/2003 | Rowe et al. .................... 463/42 |
| 2003/0148812 A1 * | 8/2003 | Paulsen et al. ................ 463/42 |
| 2003/0186739 A1 * | 10/2003 | Paulsen et al. ................ 463/25 |
| 2004/0053681 A1 * | 3/2004 | Jordan et al. .................. 463/20 |

FOREIGN PATENT DOCUMENTS

JP      11253609 A  *  9/1999

OTHER PUBLICATIONS

Futurelogic, Inc., "Operators and Technicians Manual", Copyright 2003.

* cited by examiner

METHOD AND APPARATUS FOR GAMING PROMOTIONAL PRINTER

CROSS-REFERENCE TO RELATED APPLICATION

This application claims the benefit of U.S. Provisional Patent Application No. 60/369,097, filed Mar. 29, 2002, the contents of which are hereby incorporated by reference as if fully stated herein.

BACKGROUND OF THE INVENTION

This invention relates generally to gaming printers and more specifically to gaming printers performing promotional coupon printing.

The gaming machine manufacturing industry provides a variety of gaming machines for the amusement of gambling players. An exemplary gaming machine is a slot machine. A slot machine is an electromechanical game wherein chance or the skill of a player determines the outcome of the game. Slot machines are usually found in casinos or other more informal gaming establishments.

Gaming machine manufacturers have more recently introduced cashless enabled gaming machines to the market and these have begun to find wide acceptance in the gaming industry. Cashless enabled gaming machines are so named because they can conduct financial exchanges using a mixture of traditional currencies and vouchers. Typically, a cashless enabled gaming machine has a gaming printer to produce vouchers and a bill acceptor that supports automatic reading of vouchers. To coordinate the activities of multiple cashless enabled gaming machines, one or more cashless enabled gaming machines may be electronically coupled to a cashless enabled gaming machine system that controls the cashless operations of a cashless enabled gaming machine.

When a player cashes out using a cashless enabled gaming machine coupled to a cashless enabled gaming machine system, the cashless enabled gaming machine signals the system and the system may determine the type of pay out presented to the player. Depending on the size of the pay out, the cashless enabled gaming machine system may cause the cashless enabled gaming machine to present coins in the traditional method of a slot machine, or the cashless enabled gaming machine system may cause a gaming printer in the cashless enabled gaming machine to produce a voucher for the value of the pay out. The voucher may then be redeemed in a variety of ways. For example, the voucher may be redeemed for cash at a cashier's cage or used with another cashless enabled gaming machine. In order to use the voucher in a cashless enabled gaming machine, the voucher is inserted into a bill acceptor of another cashless enabled gaming machine at a participating casino and the cashless enabled gaming machine system recognizes the voucher, redeems the voucher, and places an appropriate amount of playing credits on the cashless enabled gaming machine.

Over the last two years, cashless enabled gaming machines have found an increasing acceptance and use in the gaming industry with players who enjoy the speed of play and ease of transporting their winnings around the casino and the casinos who have realized significant labor savings in the form of reduced coin hopper reloads in the games, and an increase in revenue because of the speed of play. This increasing acceptance practically guarantees a wide installed base of networked games with captive player audiences for issuance of coupons and promotional tickets using generally the same equipment already installed within a cashless enabled gaming machine system for the purpose of supporting cashless gaming vouchers.

SUMMARY OF THE INVENTION

In one aspect of the invention, a method of printing a promotional coupon in a gaming environment includes receiving coupon data by a gaming promotional printer in a cashless enabled game from a promotional controller via a communications network. The coupon data includes a coupon description written in a template definition language. The gaming promotional printer then generates the coupon using variable data and the coupon template in response to a trigger.

In another aspect of the invention, the variable data is received by the gaming promotional printer from the promotional controller via the communications network. In this aspect, the promotional controller generates the trigger and transmits the trigger to the gaming promotional printer via the communications network.

In another aspect of the invention, the coupon data includes trigger control parameters and the trigger is generated by the gaming promotional printer using the trigger control parameters and trigger data. The trigger data may include a date, a time of day, a frequency of issuance of the coupon, or a time of play by a player of a gaming machine.

In another aspect of the invention, the gaming promotional printer is further coupled to a gaming machine controller and the trigger data is received by the gaming promotional printer from a gaming machine controller. The trigger data may include a player identifier, an amount of money in play on a gaming machine, a duration of a current session of play of a gaming machine, a cash-in of a player or a cash-out of a player.

In another aspect of the invention, coupon issuance data is stored by the gaming promotional printer and the coupon issuance data is transmitted by the gaming promotional printer to the promotional controller via the communications network.

In another aspect of the invention, a promotional controller transmits coupon data to a gaming promotional printer via a communications network with the coupon data including a coupon template. The promotional controller transmits variable data and trigger data to the gaming promotional printer via the communications network. In response to the transmission, the gaming promotional printer generates a coupon using the coupon template and the variable data.

In another aspect of the invention, the gaming promotional printer stores coupon issuance data and the promotional controller receives the coupon issuance data by the promotional controller from the gaming promotional printer via the communications network.

In another aspect of the invention, a gaming promotional printer comprises a processor and a memory coupled to the processor. The memory has stored program instructions executable by the processor where the program instructions include receiving coupon data including a coupon template from a promotional controller via a communications network. The program instructions for the gaming promotional printer also include instructions for generating a coupon using variable data and the coupon template in response to a trigger.

In another aspect of the invention, a promotional controller includes a processor and a memory coupled to the processor. Program instructions for implementing the features of a promotional controller are stored in the memory and are executable by the processor. The program instructions include:

transmitting coupon data to a gaming promotional printer via a communications network wherein the coupon data includes a coupon template; transmitting variable data to the gaming promotional printer via the communications network; and transmitting trigger data to the gaming promotional printer whereby the gaming promotional printer generates a coupon using the coupon template and the variable data in response to the trigger data.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
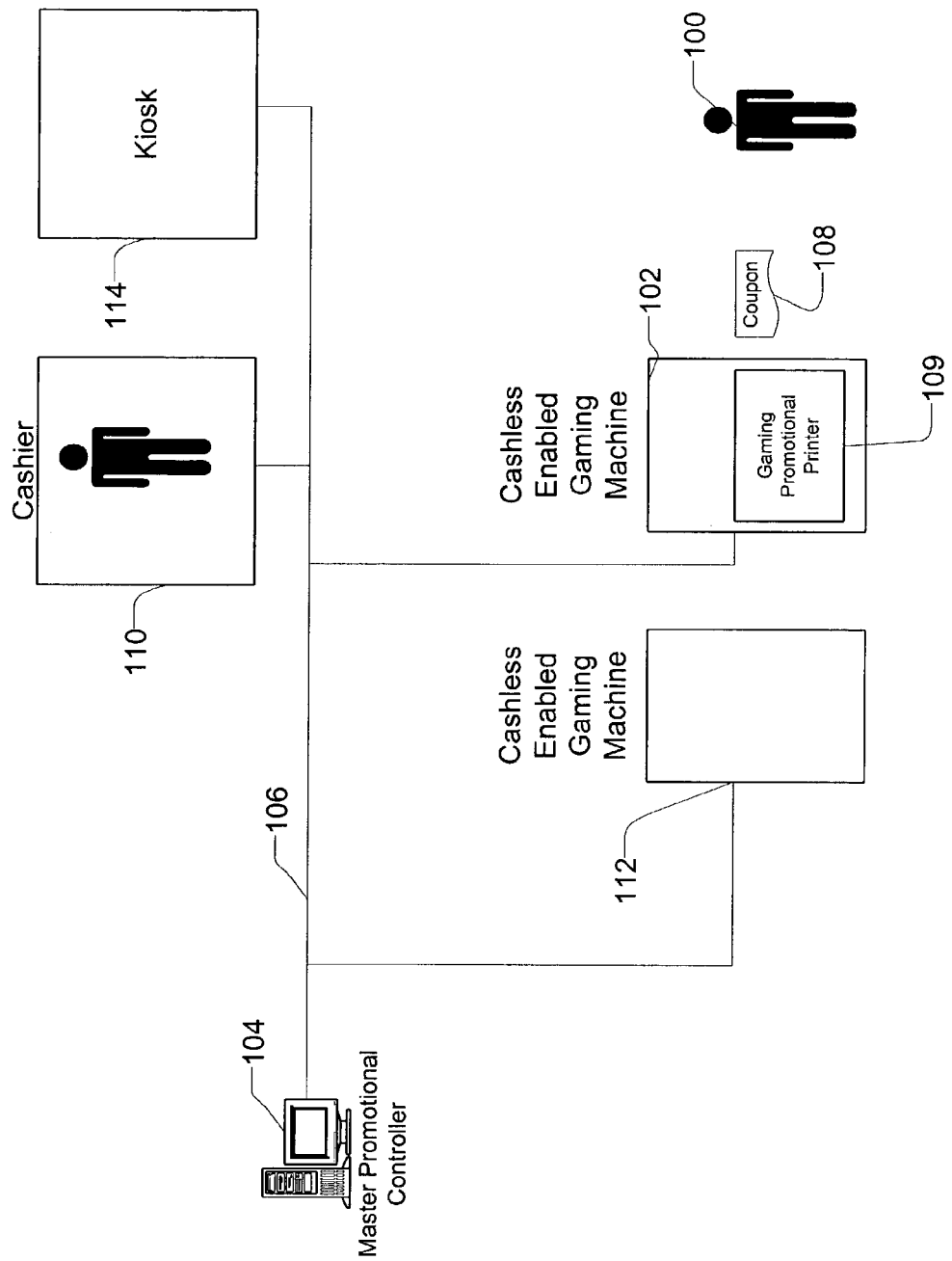
FIG. 1 is block diagram illustrating a gaming environment employing coupon issuance in accordance with an exemplary embodiment of the present invention.

FIG. 1 is block diagram illustrating a gaming environment employing couponing in accordance with an exemplary embodiment of the present invention. A player 100 uses a cashless enabled gaming machine 102 to play a gambling game or game of skill. As the player plays the game, a master promotional controller 104 coupled to one or more cashless enabled gaming machines through a communications network 106 triggers the generation of promotional coupons 108 for use by the player. The promotional coupons are generated by a promotional gaming printer 109 included in a cashless enabled gaming machine. The master promotional controller can either be a controller network connected to one or more gaming promotional printers, a controller within a cashless enabled gaming machine or gaming promotional printer, or an intelligent routing and management device for one or more gaming promotional printers. In one embodiment of a master promotional controller, the master promotional controller directs the promotional activity of the gaming promotional printers via direct promotional coupon requests. In another embodiment of a master promotional controller, the master promotional controller uses a cashless enabled gaming machine's gaming promotional printer to store promotional coupon databases and triggers.

Once a promotional coupon has been issued by a gaming promotional printer, the promotional coupon may be redeemed with a human operator or cashier 110, or redeemed automatically through a another redemption device, such as a bill acceptor in another cashless enabled gaming machine 112, or redeemed at a kiosk 114 which is not a game but provides some other form of automatic interface for a promotional coupon holder.

In one embodiment of a master promotional controller, the master promotional controller is coupled to the redemption devices. In another embodiment of an master promotional controller, a non-game kiosk or casino personnel may or may not interface back to the master promotional controller when redeeming a promotional coupon. Information relative to couponing activity is exchanged with the master promotional controller, the net result being the gaming promotional printers fitting into the system as distributed intelligent sub-units, significantly off-loading the master promotional controller's real time servicing requirements and avoiding network bandwidth issues associated with live streaming of promotional coupons during a relatively short cash-out time window.

In one gaming environment employing couponing in accordance with an exemplary embodiment of the present invention, each gaming promotional printer in the gaming environment has a unique address or identifier so that a population of gaming promotional printers on the network can be addressed in whole or individually for promotional purposes.

Figure 2:
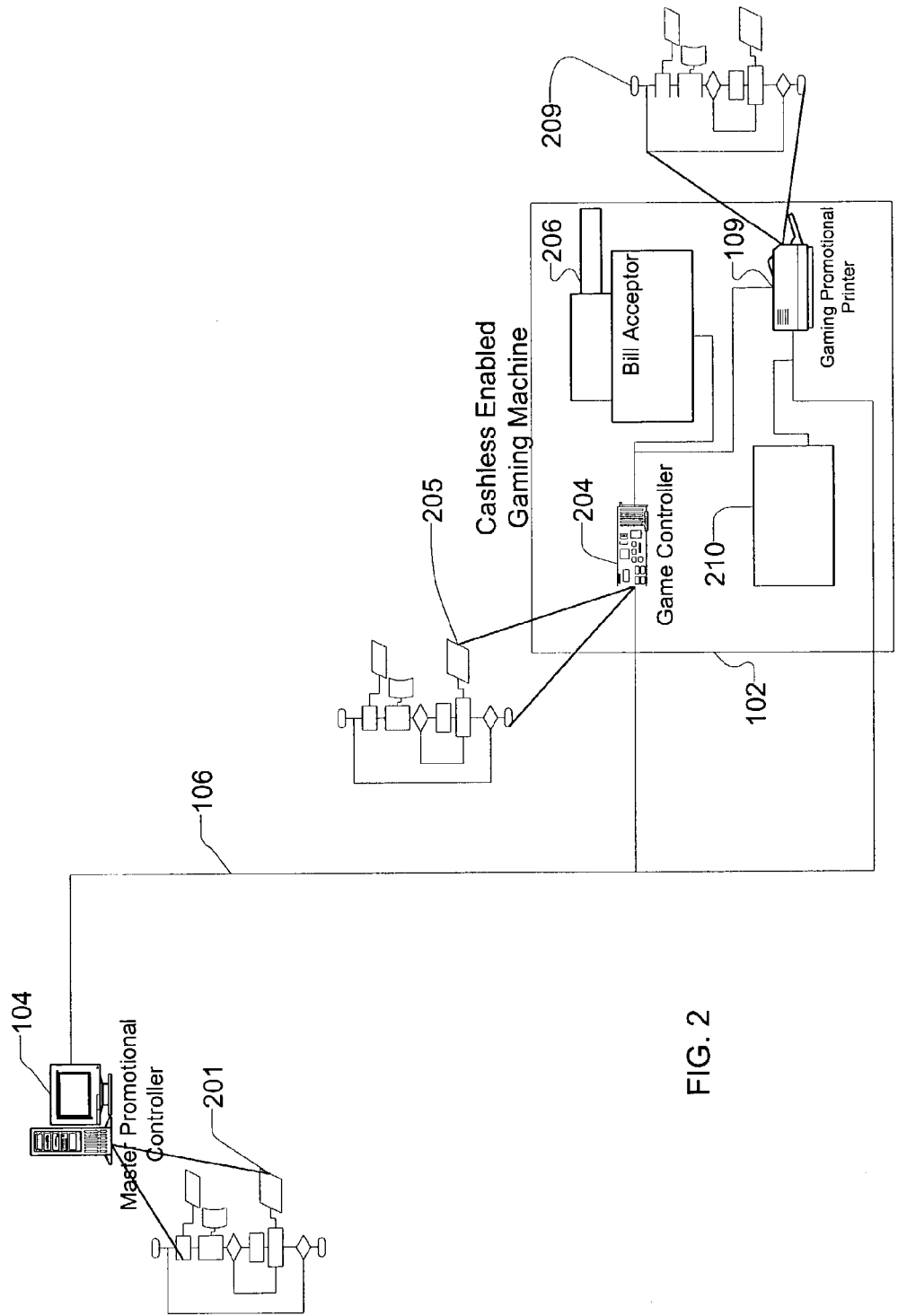
FIG. 2 is a deployment diagram of a coupon issuing system in accordance with an exemplary embodiment of the present invention.

FIG. 2 is a deployment diagram of a couponing system in accordance with an exemplary embodiment of the present invention. In a couponing system, a master promotional controller 104 is coupled to one or more cashless enabled gaming machines, as illustrated by cashless enabled gaming machine 102, through a communications network 106 by coupling to a gaming promotional printer 109 included in the cashless enabled gaming machine. The master promotional controller is programmable and includes master promotional controller programming instructions 201 controlling the master promotional controllers operations including communications with the gaming promotional printer.

In one gaming promotional printer in accordance with an exemplary embodiment of the present invention, a stand alone gaming promotional printer includes all of the necessary processing capabilities, memory, and gaming promotional printer programming instructions 209 needed to perform promotional couponing operations for the cashless enabled gaming machine. In other embodiments of gaming promotional printers, a gaming promotional printer is created by coupling a promotional module 210 to a conventional gaming printer, enabling the gaming printer to function as a gaming promotional printer. A stand alone gaming promotional printer or a gaming promotional printer created from a conventional gaming printer coupled to a promotional module are hereinafter termed a "gaming promotional printer".

The master promotional controller may be coupled to a game controller 204 included in the cashless enabled gaming machine. By coupling to a game controller, the master promotional controller may receive information from the game controller about the gaming operations of the cashless enabled gaming machine separately from the gaming promotional printer printing operations.

The cashless enabled gaming machine may also include a bill acceptor 206 coupled to the game controller. A cashless enabled gaming machine uses a bill acceptor for redemption of promotional coupons and acceptance of vouchers or cash.

In operation, the master promotional controller transmits packets of variable data or coupon data describing a promotional database to the gaming promotional printer. The contents of the promotional database include descriptions of a plurality of promotional coupons, cash vouchers, advertisements or other enticements which are hereinafter collectively referred to as "coupons". The gaming promotional printer receives the promotional database and stores the promotional database in the gaming promotional printer's local memory.

The gaming promotional printer also stores specifications of how to print the coupons in its local memory. The specifications of the coupons are stored as templates written in a template based printer language. This allows the coupons to be pre-defined, formatted, and stored in the gaming promotional printer completely or partially for later recall.

Upon reception of a trigger data signal from either the master promotional controller or the game controller, the gaming promotional printer references and parses the promotional database and coupon templates to generate and issue promotional coupons or tickets printed on paper media. The paper media may be used specifically for the purpose of generating promotional coupons, or the paper media may be used for the purpose of printing pay out vouchers associated with cashless gaming.

Figure 3:
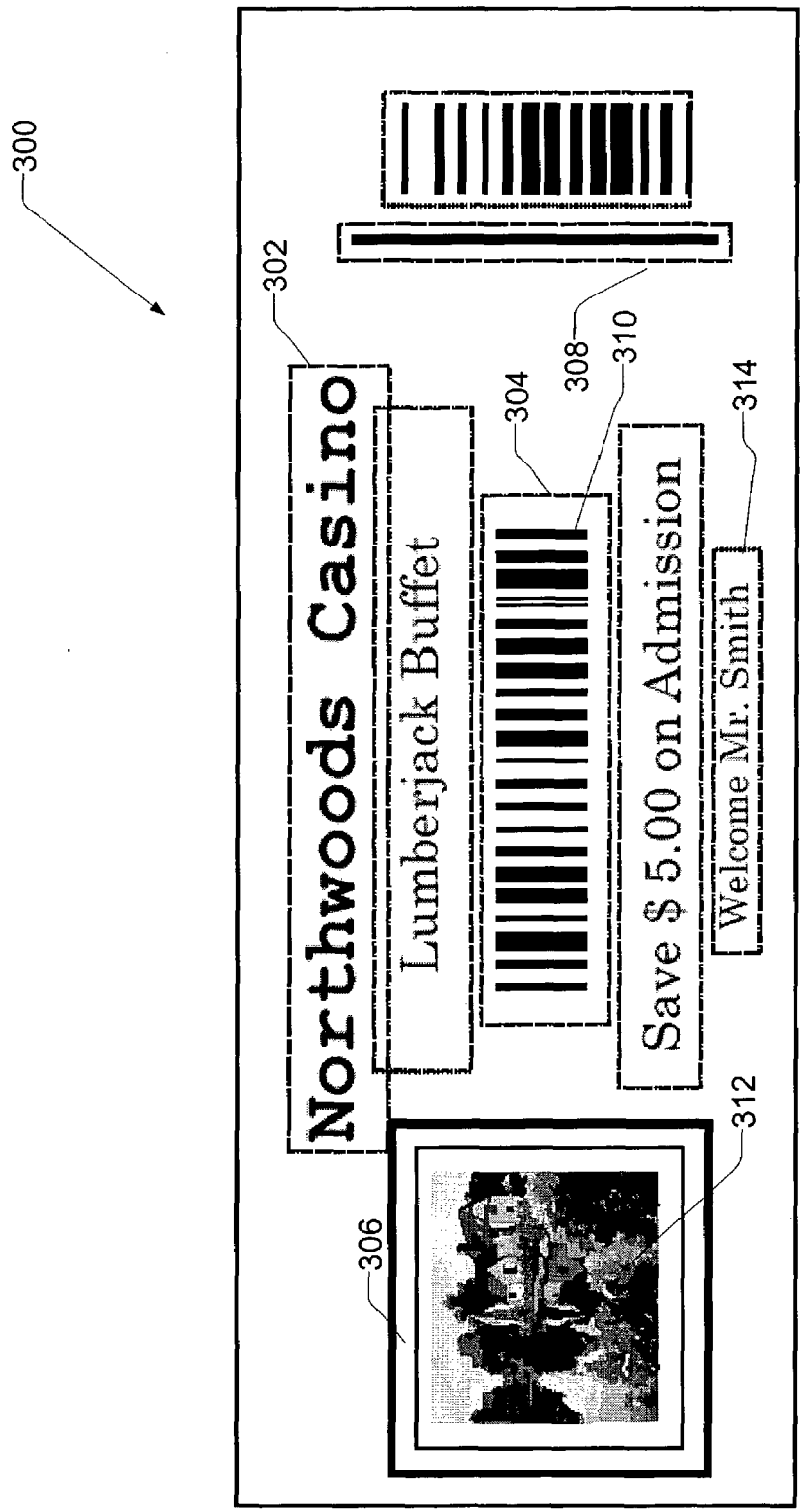
FIG. 3 is an illustration of a coupon including logical fields described in a template based printer language in accordance with an exemplary embodiment of the present invention.

FIG. 3 is an illustration of a coupon including logical fields described in a template based printer language in accordance with an exemplary embodiment of the present invention. In this example, a coupon may 300 include four types of data fields: text fields, such as text field 302; barcode fields, such as barcode field 304; graphic fields, such as graphic field 306; and line/box draw fields, such as line/box draw field 308. The fields of a coupon are described using coupon description data included in an electronic template that may be stored by a gaming promotional printer. A template may include a plurality of fields in combination, resulting in a paste-up style printed coupon. A plurality of templates describing different types of coupons may be stored in a gaming promotional printer supporting a rich couponing environment.

The actual value or data for each of the fields described in a coupon template may or may not be included in the template itself. For example, a template may include a barcode field for printing a barcode 310. However, the actual value of the barcode is transmitted to a gaming promotional printer at the time a coupon is generated using the coupon template. In this way, a coupon may have fields that include static data, such as graphic 312 in a graphic field, or dynamic data, such as the name of a particular patron 314 in a text field. In this way, customized coupons may be printed by a gaming promotional printer without transferring large amounts of data through a communications network coupling a gaming promotional printer to a master promotional controller.

In addition, data that is used to track usage of coupons may be included in a coupon. For example, a barcode field or a text field may be used to print a barcode value or text string uniquely identifying a coupon. In this way, a gaming provisional printer creates an image of a barcode or barcodes, characters or marks that may be read by a cashless enabled gaming machine bill acceptor on the same or another cashless enabled gaming machine, allowing automatic acceptance of coupons into a cashless enabled gaming system in a casino or another related casino property.

A coupon template includes a plurality of command strings. Each command string conforms to the following syntax:

delimiter<cmd_Ltr>|<data_field1>| . . . |<data_fieldx>|delimiter; comment where:
    delimiter=a delimiter character
    <cmd_ltr>=command identifier letter
    <data_fields1-x>=fields which include information relative to the command
    |=Pipe character. This serves as the delimiter between data fields in a command.
    ;=Semi-colon. This is a comment field designator.

A template defining a coupon adheres to following syntax:

delimiter< template_cmd_ltr> | < t_id> | <targ_mem>| <t_dim_da> | <t_dim_pa> | <pr#1> | <pr#2> | . . . |< pr#n> |delimiter where:
    <t_id>=Template I.D.
    <targ_mem>=target memory storage.
    <t_dim_da>=Template dimension on a dotline axis in dots.
    <t_dim_pa>=Template dimension in dots in the paper axis.
    <pr#1> . . . <pr#n>=list of coupon database resident print regions ID's used in the format of this coupon. These fields are the method by which print regions used on a coupon are linked together and to the coupon template.

A print region is a print field used in a template to format print data. The print region command is used to define the basic types of print regions such as text, barcode, graphics, and a line/box draw.

A define print region command defines the particular font, barcode, graphic, or line style which is to be used, and provides special formatting information on how it is to be used. Multiple print regions may be defined and memorized in a gaming promotional printer's coupon database.

A define print region command adheres to the follow syntax:

delimiter< print_region cmd_ltr> | <r_id> | <targ_mem>| <da_start> | <pa_start> |<da_len> | <pa_len> | <rot> | <just> |<obj_id> | <mul_1> | <mul_2> | <obj_att> | <pr_att> | <pr_data> |delimter where:
    <r_id>=print region identifier.
    <targ_mem>=target memory storage.
    <da_start>=dot axis start position in dots.
    <pa_start>=paper axis start position in dots.
    <da_len>=dot axis length of print region in dots.
    <pa_len>=paper axis length of print region in dots.
    <rot>=rotation of strings or data within print region.
    <just>=justification of data within print region.
    <obj_id>=print object identifier. Range 1 byte. This is the print object (barcode, font, line/box or graphic) used to format print the data from a print command.
    <mul_1>=Print object multiplier 1. For text, it is a font width multiplier. For barcodes, it indicates narrow bar width or modulo bar width. For a line, this represents thickness of the line in dots.
    <mul_2>=Print object multiplier 2. For text, this represents a font height multiplier. For a barcode, it indicates a wide bar width.
    <obj_att>=object printing attributes. This contains special instructions on how to treat the print objects within a print region
    <pr_att>=print region attributes. This contains special instructions on handling of the print region. A '0' indicates text will be sent in a print batch command. A '1' indicates use text which follows in pr_data field for a print region. A '2' indicates a print region will auto increment with each coupon in a batch. The base value is stored in a pr_data field. A '3' indicates an auto-decrement print region which will auto-decrement with each coupon in a batch. The base value is stored in a pr_data field.

<pr_data>=permanently stored data which always appears in this print region. This field contains stored text if requested by entering a '2' in <pr_att> field.

A library command is used to manage defined graphics. A library command adheres to the following syntax:

delimiter< library_cmd_ltr> | <lib_funct> | <mem> | <obj_id> | <mem_req> | ld_file_size> | obj_data delimiter where:
<lib_funct>=operation to perform: 'A'—add object, enter download mode, 'D'—delete object.
<mem>=target memory in which to place the object being downloaded.
<obj_id>=object identification. This is the object I.D. byte.
<mem_req>=memory usage specifier. For loading a graphic: size of a graphic file. The library command header is terminated after this field and obj_data is expected immediately following. For deleting graphics: 'G' is used in this field.
<ld_file_size>=file size indicator.
obj_data=object data (font or graphic) in appropriate format if <lib_funct>='A'. Format for graphics: PCX.

Figure 4:
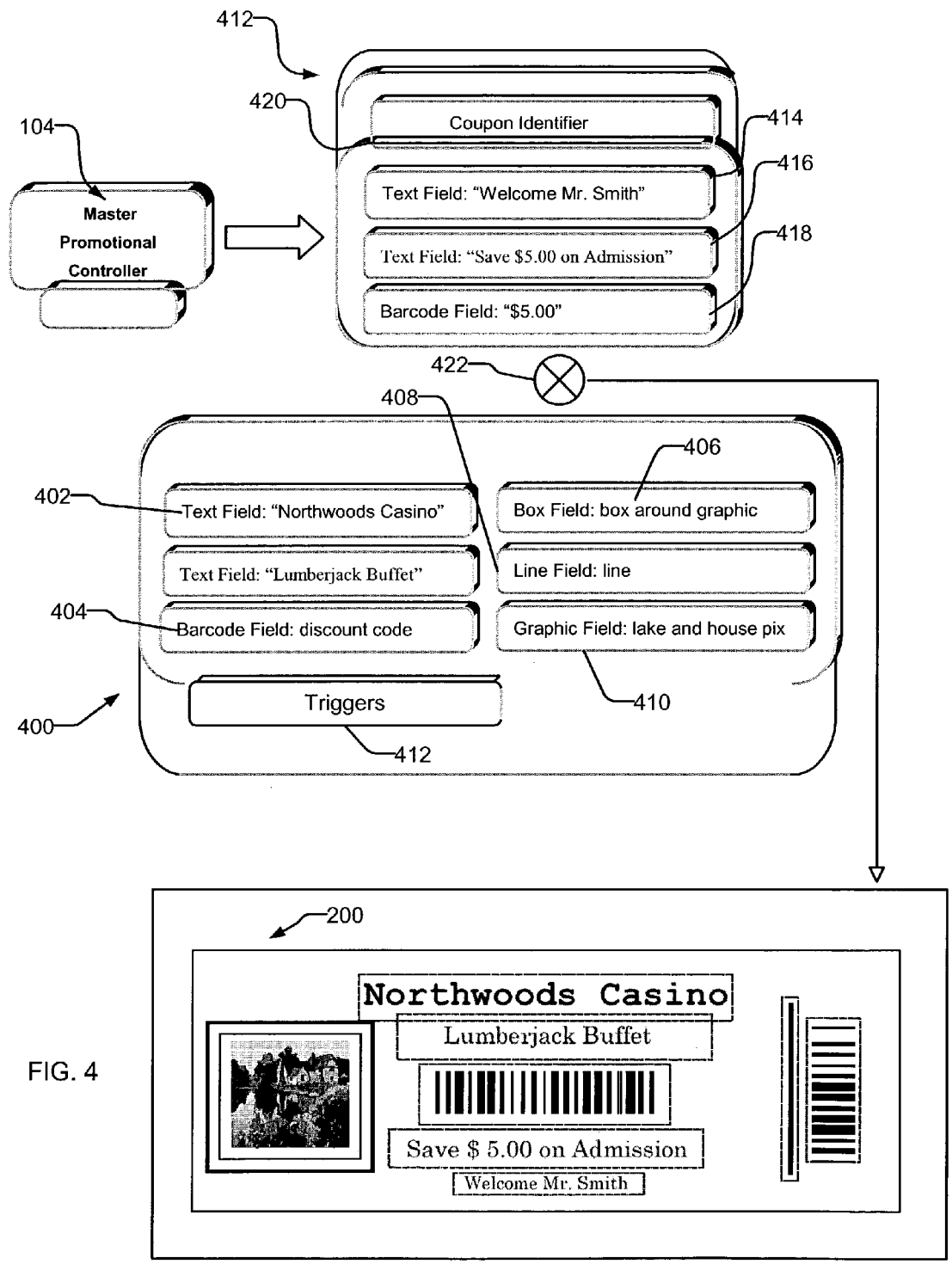
FIG. 4 is a block diagram of coupon template field elements stored partially resident in a promotional gaming printer and partially supplied by a master promotional controller at the time of print and issue in accordance with an exemplary embodiment of the present invention.

FIG. 4 is a block diagram of coupon template field element stored partially resident in a promotional gaming printer and partially supplied by a master promotional controller at the time of print and issue in accordance with an exemplary embodiment of the present invention. FIG. 4 illustrates how a master promotional controller selects a type of coupon and transmits particulars, such as variable data to be placed in fields in the coupon, for each print and issuance event. Values for the fields that make up a coupon 300 may be divided into two groups or sets. A resident variable data set 400 may be stored locally in a gaming promotional printer. The resident set of variable data may include variable data such as: variable data for a text field containing an identifier of a casino 402; variable data for a barcode field identifying a type of promotion 404; a template description used to generate a graphic such as box variable data 406 or line variable data 408; or an identifier or actual variable data for a graphic 410. A dynamic variable data set include variable data for fields having variable data that are stored in the gaming promotional printer and are saved in a template definition for a particular coupon. Examples of variable data in a dynamic variable data set include: text variable data for a player identifier 414; text variable data describing a promotion item 416; and barcode variable data 418 for quantifying a value of a promotion for printing on the coupon.

Both variable data sets may be transmitted from a master promotional controller 104 to a gaming promotional printer in the form of communication packets. When a gaming promotional printer receives a variable data set, the gaming promotional printer stores the variable data set for future use. A resident variable data set includes variable data that may be reused for generating many coupons; therefore, a resident variable data set may be stored in the gaming promotional printer for an extended period of time. In contrast, a dynamic variable data set may be used for a short period of time, perhaps for even a single generation of a single coupon. As such, the dynamic variable data set and static variable data set associated in a coupon may be transmitted to a gaming promotional printer at different times. To retain association between the variable data sets, part of the communication packet issued by the master promotional controller may include a reference 420 to a template definition so that the dynamic data in the communication packet can be combined 422 with the static field data stored in a gaming promotional printer to generate a complete coupon 200.

Since it is possible to store all fields used in a coupon within the gaming promotional printer's memory, a master promotional controller may issue a complete coupon by simply sending a reference to a coupon so defined to generate a coupon in its entirety. It is also possible for a master promotional controller to offload the entire live communication burden by sending a complete coupon database including triggers during off-peak times.

In one embodiment of a gaming promotional printer, a gaming promotional printer is triggered to print coupons from the gaming promotional printer's internal database under direct control of a master promotional controller that triggers the issuance of a coupon and conveys any pertinent variable information associated with the coupon such as promotion type, face value of the coupon, date of expiration and the like.

Figure 5:
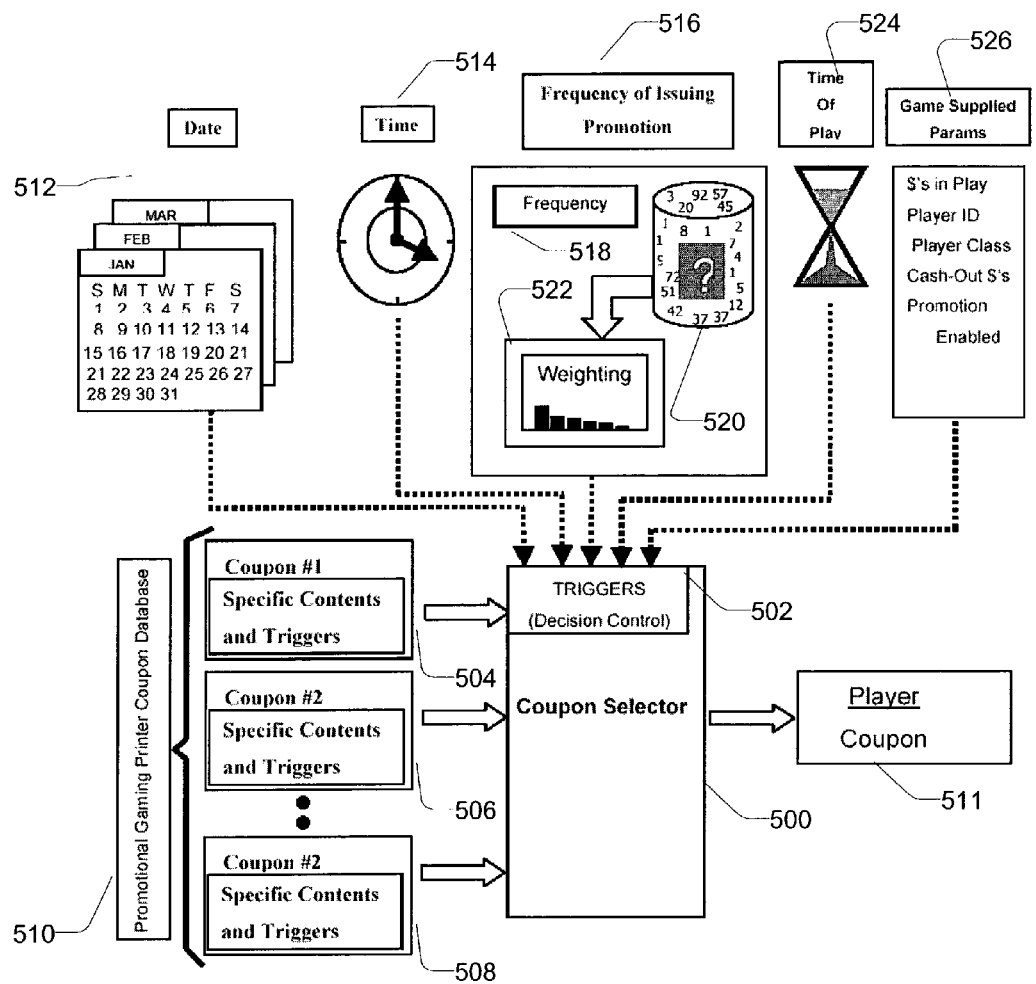
FIG. 5 is a block diagram of an exemplary coupon "stack" and logical trigger matrix resident in a gaming promotional printer in accordance with an exemplary embodiment of the present invention.

FIG. 5 is a block diagram of an exemplary coupon stack and logical trigger matrix resident in a gaming promotional printer in accordance with an exemplary embodiment of the present invention. As previously noted, a gaming promotional printer may print a coupon in response to either internal or external event signals or trigger data. To respond to a trigger, a gaming promotional printer includes a coupon selector logic module 500 that analyzes trigger data 502 as trigger data becomes available and determines which coupons should be printed in response to the trigger data. Coupons, such as coupons 504, 506, and 508, are stored in a coupon database 510 as a stack. The stack of coupons are a plurality of predefined coupons that can generate a coupon 511 anytime a set of trigger conditions to which a coupon is associated is satisfied. These trigger conditions can operate independently or in logical combination.

Exemplary logical trigger data utilized in a gaming promotional printer for initiating generation of coupons includes: date 512, time of day 514, frequency of issuance of a particular coupon 516, time of play 524, and game issued parameters 526 to the printer such as player identification, amount of money in place, duration of the current session of play and the like. By utilizing the illustrated trigger matrix, it is possible for a gaming promotional printer to issue coupons without any information provided by an master promotional controller at the time of a cash-out or cash-in by a player.

In one gaming promotional printer in accordance with an exemplary embodiment of the invention, the gaming promotional printer receives from a master promotional controller a coupon trigger database thereby enabling the gaming promotional printer to self-manage its couponing activity. The coupon trigger database may include different types of trigger control parameters including: triggering a coupon generation anytime a cash out voucher is printed; generating a coupon whenever a voucher for greater than, equal to, or less than a specified amount of money is issued; generating a coupon based on an identity of a player; generating a coupon based on a category or classification of a player related to frequency of play or money volume; generating a coupon based on the duration of play of the gaming machine by a player; and generating a coupon anytime a player adds money or credits to a game in an amount greater than, equal to, or less than a specified amount.

In another aspect of the invention, a component of the gaming promotional printer's internal database includes a set of control parameters that instruct the gaming promotional printer to select the type, quantity, and frequency of coupons to create and issue related to any of the triggers listed above. These control parameters may operate separately or in combination with each coupon in the database. Parameters that may be used include: a total quantity of a coupon being issued before the coupon is retired from the coupon database; a frequency 518 of issuance of a coupon based on the number of occurrences of specified trigger events; a frequency of issuance of a coupon based on random odds 520, such as one in one hundred trigger events; a backup coupon or coupons should a particular coupon fail to print for lack of satisfying its specified set of qualifiers; whether or not the coupon is issued based on the time the trigger occurred; and whether the coupon is issued based on the date the trigger occurred.

In one embodiment of gaming promotional printer, a real time clock electronic device is included within the gaming promotional printer for the purposes of supporting time dependent promotional activity as described above.

Figure 6:
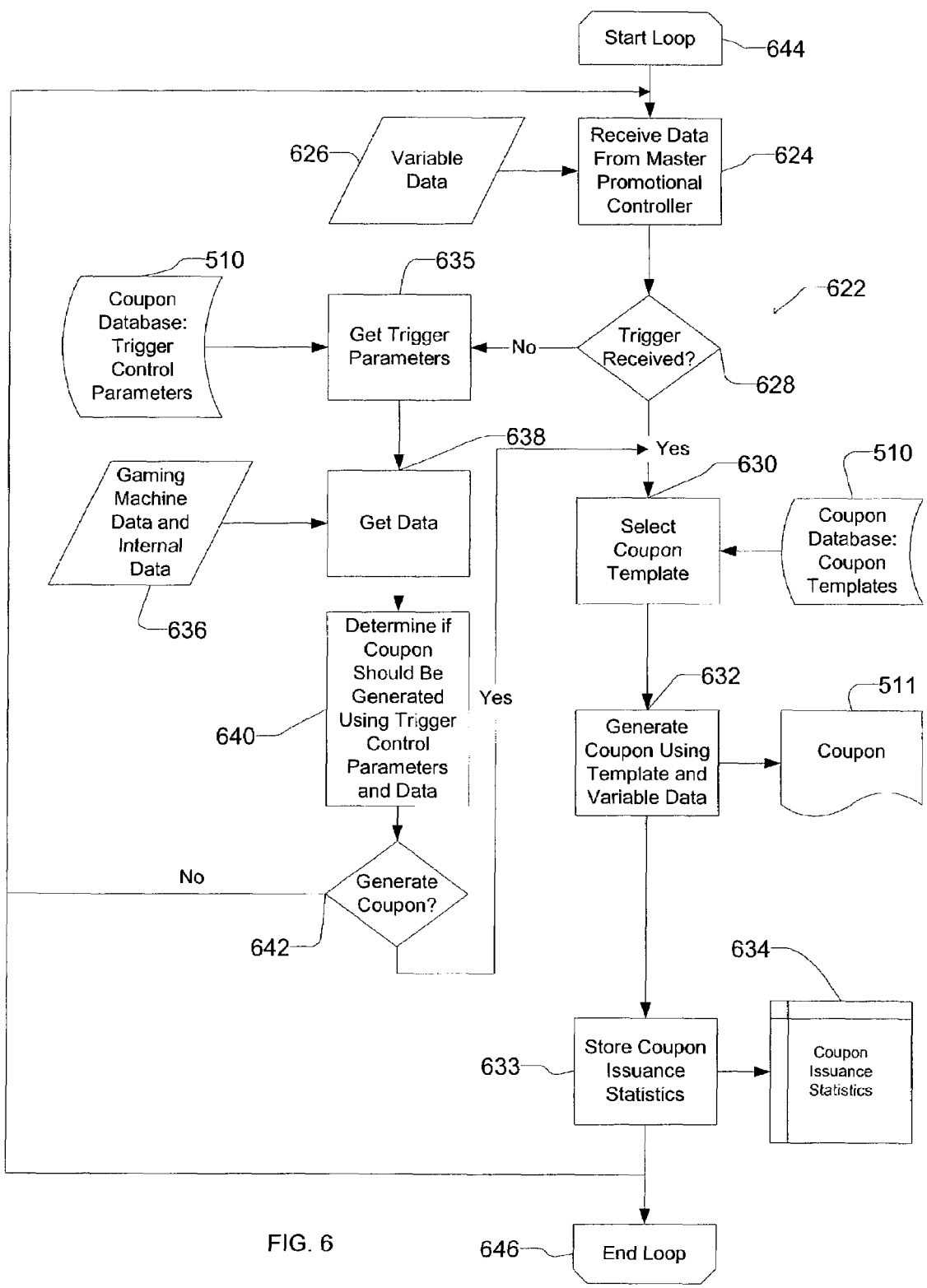
FIG. 6 is a process flow diagram of a coupon generation process in accordance with an exemplary embodiment of the present invention.

FIG. 6 is a process flow diagram of a trigger matrix process in accordance with one exemplary embodiment of the present invention. A trigger matrix process 622 is used by a gaming promotional printer to determine if a coupon should be generated and issued to a player. The trigger matrix process receives (624) variable data from a master promotional controller. The trigger matrix process determines (628) if the variable data includes a coupon trigger instructing the gaming promotional printer to issue a coupon. If so, the trigger matrix process selects (630) an appropriate coupon to issue from a coupon database 510. The trigger matrix process then generates (632) a coupon 511 using the selected coupon template. In addition, the trigger matrix process may use a portion of the variable data received from the master promotional controller to customize the coupon when the coupon is generated. The trigger matrix process may then store (633) coupon issuance statistical data (634) for later retrieval by the master promotional controller.

A trigger matrix process may also initiate issuance of a coupon even if the master promotional controller does not transmit a trigger to the gaming promotional printer. To do so, the matrix trigger process gets (635) trigger control parameters stored in the promotional coupon database 510 that correspond to stored coupon templates in the promotional coupon database. The trigger matrix process then gets (638) gaming machine and other internal data 636 and determines (640) if a coupon should be issued using the data and trigger control parameters. If the trigger matrix process determines (642) that a coupon should be generated, the trigger matrix process issues a coupon as previously described, this time selecting a coupon template using the trigger control parameters.

The gaming promotional printer is a real-time device meaning that it continuously processes incoming trigger data and triggers. As such, the trigger matrix process may be configured as an endless loop as indicated by the start loop 644 and stop loop 646 symbols.

Figure 7:
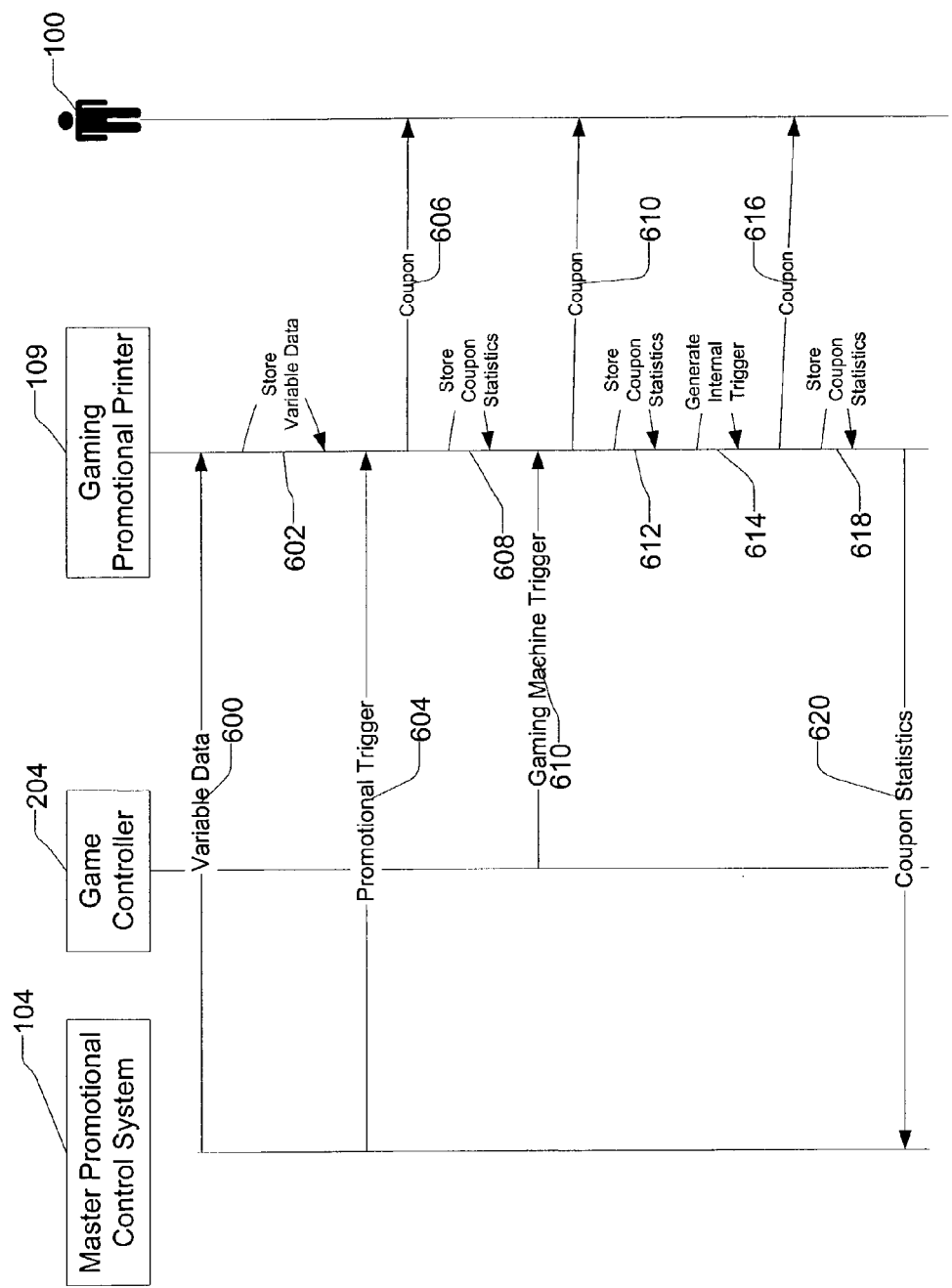
FIG. 7 is a sequence diagram of a coupon generating process in accordance with an exemplary embodiment of the present invention.

FIG. 7 is a sequence diagram of a coupon generating process in accordance with an exemplary embodiment of the present invention. A master promotional controller 104 transmits coupon or variable data 600 to a gaming promotional printer 109. The gaming promotional printer stores (602) the coupon data for later use by the gaming promotional printer in printing a coupon. As previously described, the coupon data may include coupon templates, sets of dynamic and static variable data, trigger control parameters, and entire promotional coupon databases.

A gaming promotional printer may receive various triggers that initiate generation of a coupon for a player 100. The master promotional controller may transmit a promotional trigger (604) to the gaming promotional printer. In response to the promotional trigger, the gaming promotional printer generates a coupon 606 for use by the player. The gaming promotional printer then stores (608) statistical data about the just generated coupon. The gaming promotional printer may also receive a gaming machine trigger 610 from a game controller 204 in a cashless enabled gaming machine. In response to the gaming machine trigger, the gaming promotional printer generates a coupon 610 for use by the player. The gaming promotional printer then stores (612) statistical data about the just generated coupon. The gaming promotional printer may also generate (614) an internal trigger on its own such that the gaming promotional printer generates a coupon 616 for use by the player. The gaming promotional printer then stores (618) statistical data about the just generated coupon.

Periodically, or at the request of the master promotional controller, the gaming promotional printer may transmit the saved coupon statistical data to the master promotional controller for analysis and other types of processing. The coupon tracking or statistical data may include details such as quantities of specific types of triggers received, quantities of each type of coupon issued, and the times and dates when triggers were received and coupons were issued.

In a gaming promotional printer in accordance with an exemplary embodiment of the present invention, the gaming promotional printer accepts promotional database loads and transfers statistical data with the master promotional controller either through a main communication port used for normally signaling pay out vouchers in the game, or through an auxiliary port allowing the gaming promotional printer's promotional activities to be conducted in series or in parallel with the gaming promotional printer's cash-out voucher printing functions within the cashless enabled gaming machine.

Figure 8:
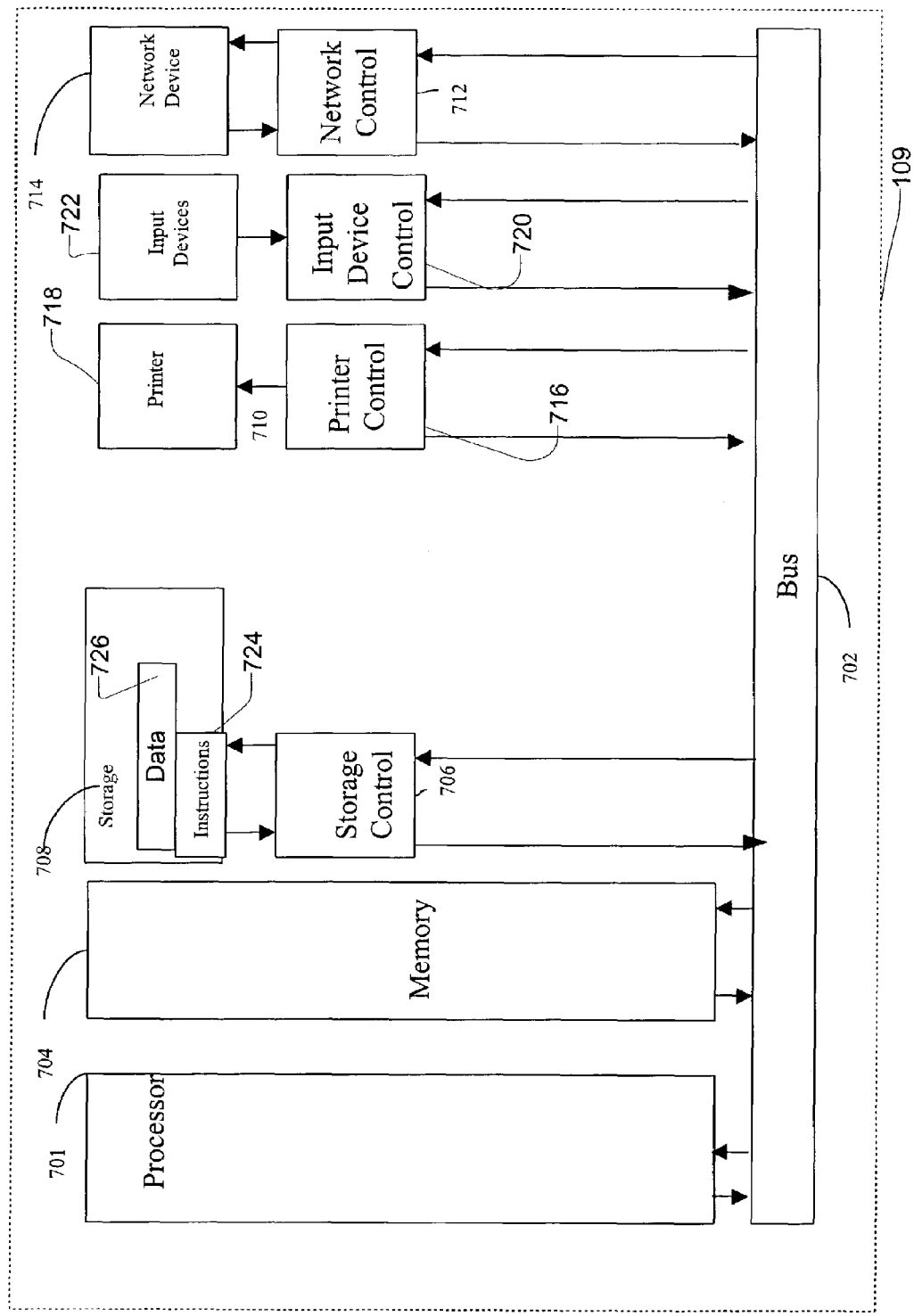
FIG. 8 is an architecture diagram of an exemplary promotional gaming printer in accordance with an exemplary embodiment of the present invention.

FIG. 8 is an architecture diagram of an exemplary promotional gaming printer in accordance with an exemplary embodiment of the present invention. A gaming promotional printer 109 includes a processor 701 operatively coupled via a system bus 702 to a main memory 704. The processor is also coupled to a storage device 708 via a storage controller 706 and the bus. The storage device includes stored program instructions 724 and data 726 such as coupon variable data, coupon templates, and coupon trigger control parameters. In operation, the program instructions implementing a gaming promotional printer are stored on the storage device until the processor retrieves the program instructions and stores them in the main memory. The processor then executes the computer program instructions stored in the main memory and operates on the data stored in the storage device to implement the features of a gaming promotional printer as described above.

The processor is further coupled to a printer mechanism 718 through a printer controller 716 via the bus. In operation, the processor executes the program instructions to generate printer mechanism control signals and transmits these signals to the printer mechanism via the bus and printer controller. In response to the printer mechanism control signals, the printer mechanism prints coupons for use by a player.

The processor is further coupled to external input devices 722 by an input device controller 720 via the bus. Example input devices include sensors that the gaming promotional printer uses to detect proper printing of a coupon by the printer mechanism, coupon printer paper detectors, and real time clocks. The processor receives input device signals from the input devices via the input device controller and the bus and uses the input device signals to detect the state of the gaming promotional printer's environment.

The processor is further coupled to a network device 714 via a network device controller 712 and the bus. The process uses the network device to communicate with other processing systems, such as a master promotional controller or a gaming machine controller as previously described.

Figure 9:
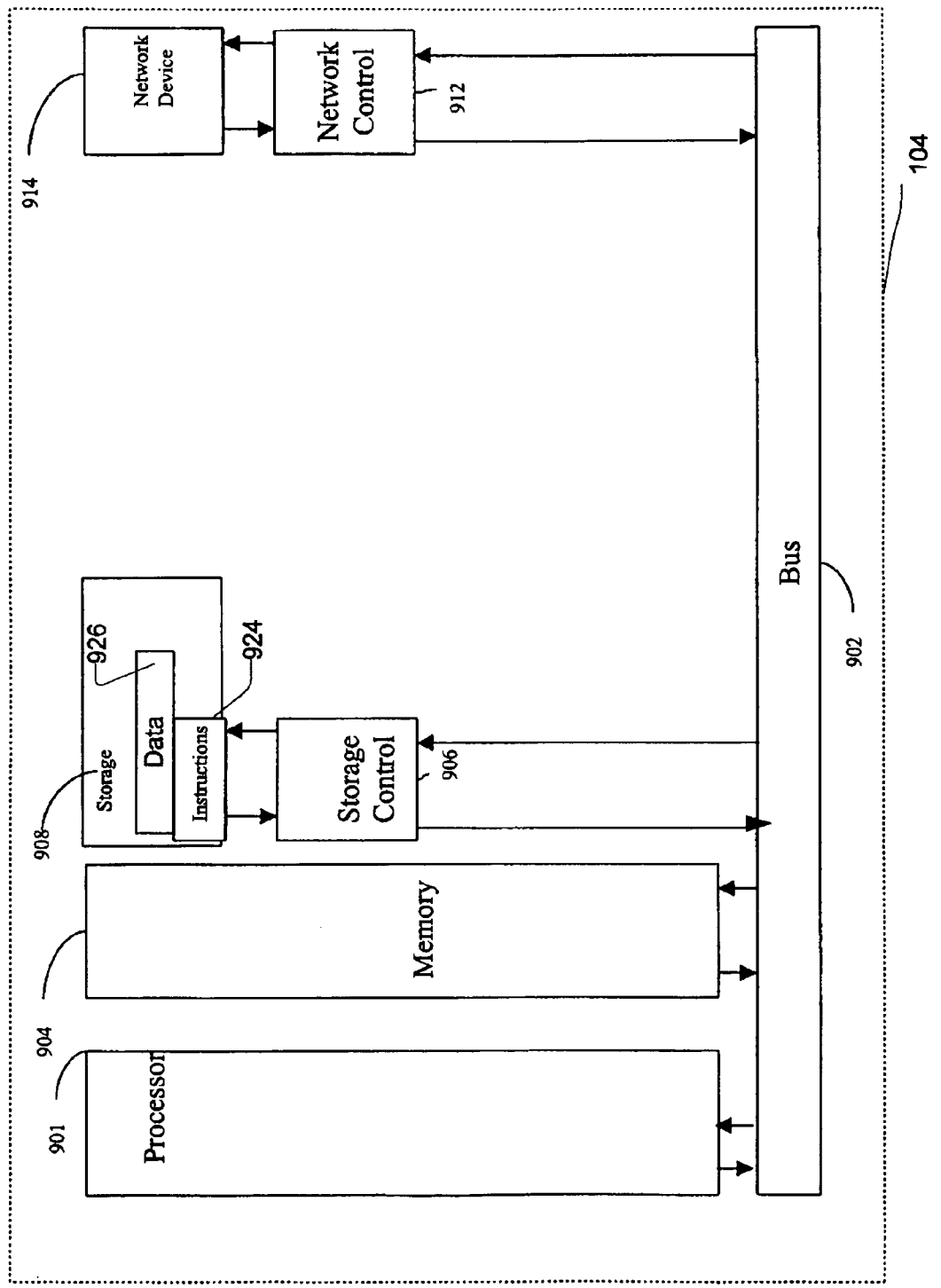
FIG. 9 is an architecture diagram of an exemplary master promotional controller in accordance with an exemplary embodiment of the present invention.

FIG. 9 is an architecture diagram of an exemplary promotional master promotional controller in accordance with an exemplary embodiment of the present invention. A master promotional controller includes a processor 901 operatively coupled via a system bus 902 to a main memory 904. The processor is also coupled to a storage device 908 via a storage controller 906 and the bus. In operation, program instructions 924 implementing a master promotional controller are stored on the storage device until the processor retrieves the program instructions and stores them in the main memory. The processor then executes the computer program instructions stored in the main memory to implement the features of a master promotional controller as described above.

The processor is further coupled to a network device 914 via a network device controller 912 and the bus. The process uses the network device to communicate with other processing systems, such as a gaming promotional printer or a gaming machine controller as previously described.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A promotional printer, comprising:
a main communication port for coupling the promotional printer to a machine controller, the main communication port adapted to receive voucher data from the machine controller;
an auxiliary communication port, separate from the main communication port, for coupling the promotional printer to a promotional controller, the auxiliary communication port adapted to receive coupon data directly from the promotional controller separately of the machine controller; and
a processor adapted to:
receive the voucher data from the machine controller via the main communication port and generate a voucher using the voucher data; and
receive the coupon data from the promotional controller via the auxiliary communication port and generate a coupon using the coupon data.

2. The promotional printer of claim 1, wherein the processor is further adapted to conduct couponing activities in serial with vouchering activities.

3. The promotional printer of claim 1, wherein the processor is further adapted to conduct couponing activities in parallel with vouchering activities.

4. The promotional printer of 1, wherein:
the coupon data includes a coupon template; and
the processor is further adapted to generate the coupon using variable data and the coupon template.

5. The promotional printer of claim 4, wherein the processor is further adapted to receive the variable data from the promotional controller via the auxiliary communication port.

6. The promotional printer of claim 4, wherein the processor is further adapted to receive the variable data from the machine controller via the main communication port.

7. The promotional printer of claim 4, wherein the processor is further adapted to generate the coupon in response to a trigger.

8. The promotional printer of claim 7, wherein the processor is further adapted to receive the trigger from the machine controller via the main communication port.

9. The promotional printer of claim 7, wherein the processor is further adapted to receive the trigger from the promotional controller via the auxiliary communication port.

10. The promotional printer of claim 7, wherein:
the coupon data includes trigger control parameters; and
the processor is further adapted to:
receive trigger data; and
generate the trigger using the trigger control parameters and the trigger data.

11. The promotional printer of claim 10, wherein the processor is further adapted to receive the trigger data from the promotional controller via the auxiliary communication port.

12. The promotional printer of claim 10, wherein the processor is further adapted to receive the trigger data from the machine controller via the main communication port.

13. The promotional printer of claim 10, wherein the trigger data includes a date.

14. The promotional printer of claim 10, wherein the trigger data includes a time of day.

15. The promotional printer of claim 10, wherein the trigger data includes a frequency of issuance of the coupon.

16. The promotional printer of claim 10, wherein the trigger data includes a time of play by a player of a gaming machine controlled by the machine controller.

17. The promotional printer of claim 10, wherein the trigger data includes a player identifier of a player of a gaming machine controlled by the machine controller.

18. The promotional printer of claim 10, wherein the trigger data includes an amount of money in play on a gaming machine controlled by the machine controller.

19. The promotional printer of claim 10, wherein the trigger data includes a duration of a current session of play of a gaming machine controlled by the machine controller.

20. The promotional printer of claim 10, wherein the trigger data includes a cash-in of a player of a gaming machine controlled by the machine controller.

21. The promotional printer of claim 10, wherein the trigger data includes a cash-out of a player of a gaming machine controlled by the machine controller.

22. The promotional printer of claim 10, wherein the trigger data includes an expiration date.

23. The promotional printer of claim 4, wherein the variable data includes a player identification of a player of a gaming machine controlled by the machine controller.

24. The promotional printer of claim 4, wherein the variable data includes a gaming machine identification of a gaming machine controlled by the machine controller.

25. The promotional printer of claim 4, wherein the variable data includes an expiration date.

26. The promotional printer of claim 4, wherein the variable data includes a barcode.

27. The promotional printer of claim 4, wherein the variable data includes an image.

28. The promotional printer of claim 4, wherein the variable data includes an image of a coupon.

29. The promotional printer of claim 1, wherein the coupon is a promotional coupon for goods.

30. The promotional printer of claim 1, wherein the coupon is a promotional coupon for a service.

31. The promotional printer of claim 1, wherein the voucher is a voucher redeemable in a gaming machine.

32. The promotional printer of claim 1, wherein the voucher is a cash-out voucher for a gaming machine.

33. The promotional printer of claim 4, wherein the variable data includes a graphic image.

34. The promotional printer of claim 4, wherein the variable data includes a graphic image of a coupon.

35. The promotional printer of claim 1, wherein the processor is further adapted to transmit coupon issuance data to the promotional controller via the auxiliary communication port.

36. A method of printing coupons by a promotional printer having a main communication port for coupling the promotional printer to a machine controller, the main communication port adapted to receive voucher data from the machine controller for printing a voucher, the method comprising:
  receiving coupon data from a promotional controller via an auxiliary communication port separate from the main communication port, the auxiliary communication port adapted to receive the coupon data directly from the promotional controller and separately of the machine controller; and
  printing a coupon by the promotional machine printer using the coupon data.

37. The method of claim 36, further comprising:
  receiving the voucher data by the promotional printer from a gaming machine controlled by the machine controller via the main communication port; and
  printing the voucher by the promotional printer using the voucher data in serial with generating the coupon.

38. The method of claim 36, further comprising:
  receiving the voucher data by the promotional printer from a gaming machine controlled by the machine controller via the main communication port; and
  printing the voucher by the promotional printer using the voucher data in parallel with printing the coupon.

39. The method of claim 36, wherein the coupon data includes a coupon template, the method further comprising printing the coupon using variable data and the coupon template.

40. The method of claim 39, wherein the variable data is received from the promotional controller via the auxiliary communication port.

41. The method of claim 39, wherein the variable data is received from a gaming machine controlled by the machine controller via the main communication port.

42. The method of claim 39, further comprising printing the coupon in response to a trigger.

43. The method of claim 42, further comprising receiving the trigger from a gaming machine controlled by the machine controller via the main communication port.

44. The method of claim 42, further comprising receiving the trigger from the promotional controller via the auxiliary communication port.

45. The method of claim 42, wherein the coupon data includes trigger control parameters, the method further comprising:
  receiving trigger data; and
  printing the trigger using the trigger control parameters and the trigger data.

46. The method of claim 45, further comprising receiving the trigger data from the promotional controller via the auxiliary communication port.

47. The method of claim 45, further comprising receiving the trigger data from a gaming machine controlled by the machine controller via the main communication port.

48. The method of claim 45, wherein the trigger data includes a date.

49. The method of claim 45, wherein the trigger data includes a time of day.

50. The method of claim 45, wherein the trigger data includes a frequency of issuance of the coupon.

51. The method of claim 45, wherein the trigger data includes a time of play by a player of a gaming machine controlled by the machine controller.

52. The method of claim 45, wherein the trigger data includes a player identifier.

53. The method of claim 45, wherein the trigger data includes an amount of money in play on a gaming machine controlled by the machine controller.

54. The method of claim 45, wherein the trigger data includes a duration of a current session of play of a gaming machine controlled by the machine controller.

55. The method of claim 45, wherein the trigger data includes a cash-in of a player of a gaming machine controlled by the machine controller.

56. The method of claim 45, wherein the trigger data includes a cash-out of a player of a gaming machine controlled by the machine controller.

57. The method of claim 45, wherein the trigger data includes an expiration date.

58. The method of claim 39, wherein the variable data includes a player identification of a player of a gaming machine controlled by the machine controller.

59. The method of claim 39, wherein the variable data includes a gaming machine identification of a gaming machine controlled by the machine controller.

60. The method of claim 39, wherein the variable data includes an expiration date.

61. The method of claim 39, wherein the variable data includes a barcode.

62. The method of claim 39, wherein the variable data includes an image.

63. The method of claim 39, wherein the variable data includes an image of a coupon.

64. The method of claim 36, wherein the coupon is a promotional coupon for goods.

65. The method of claim 36, wherein the coupon is a promotional coupon for a service.

66. The method of claim 36, wherein the voucher is a voucher redeemable in a gaming machine.

67. The method of claim 36, wherein the voucher is a cash-out voucher for a gaming machine.

68. The method of claim 39, wherein the variable data includes a graphic image.

69. The method of claim 39, wherein the variable data includes a graphic image of a coupon.

70. The method of claim 36, further comprising transmitting coupon issuance data to the promotional controller via the auxiliary communication port.

71. A promotional printer, comprising:
  voucher data receiving means for receiving voucher data from a machine controller;
  coupon data receiving means, separate from the voucher data receiving means, for receiving coupon data directly from a promotional controller and separately of the machine controller;
  printing means for printing a coupon using the coupon data and for printing a voucher using the voucher data.

72. The promotional printer of claim 71, wherein the coupon data receiving means is an auxiliary communication port and the voucher data receiving means is a main communication port.

73. The promotional printer of claim 71, further comprising variable data receiving means for receiving variable data for the coupon, wherein the printing means uses the variable data and the coupon data to print the coupon.

74. The promotional printer of claim 73, wherein the variable data receiving means is a main communication port.

75. The promotional printer of claim 73, wherein the variable data receiving means is an auxiliary communication port.

76. The promotional printer of claim 73, wherein the variable data is received from a gaming machine controlled by the machine controller.

77. The promotional printer of claim 73, wherein the variable data is received from the promotional controller.

78. The promotional printer of claim 71, wherein the printing means prints the coupon in response to a trigger, the promotional printer further comprising trigger receiving means for receiving the trigger.

79. The promotional printer of claim 78, wherein the promotional printer receives the trigger from the promotional controller.

80. The promotional printer of claim 78, wherein the promotional printer receives the trigger from a gaming machine controlled by the machine controller.

81. The promotional printer of claim 71, wherein the coupon is a promotional coupon for goods.

82. The promotional printer of claim 71, wherein the coupon is a promotional coupon for a service.

83. The promotional printer of claim 71, wherein the voucher is a voucher redeemable in a gaming machine.

84. The promotional printer of claim 71, wherein the voucher is a cash-out voucher for a gaming machine.

* * * * *